Nov. 15, 1949 I. J. MARRIAGE 2,488,018
TANDEM ROTARY HELICOPTER
Filed Aug. 23, 1943 6 Sheets-Sheet 1

INVENTOR.
BY Ira J. Marriage.
ATTORNEYS.

Nov. 15, 1949     I. J. MARRIAGE     2,488,018
TANDEM ROTARY HELICOPTER
Filed Aug. 23, 1943     6 Sheets-Sheet 2
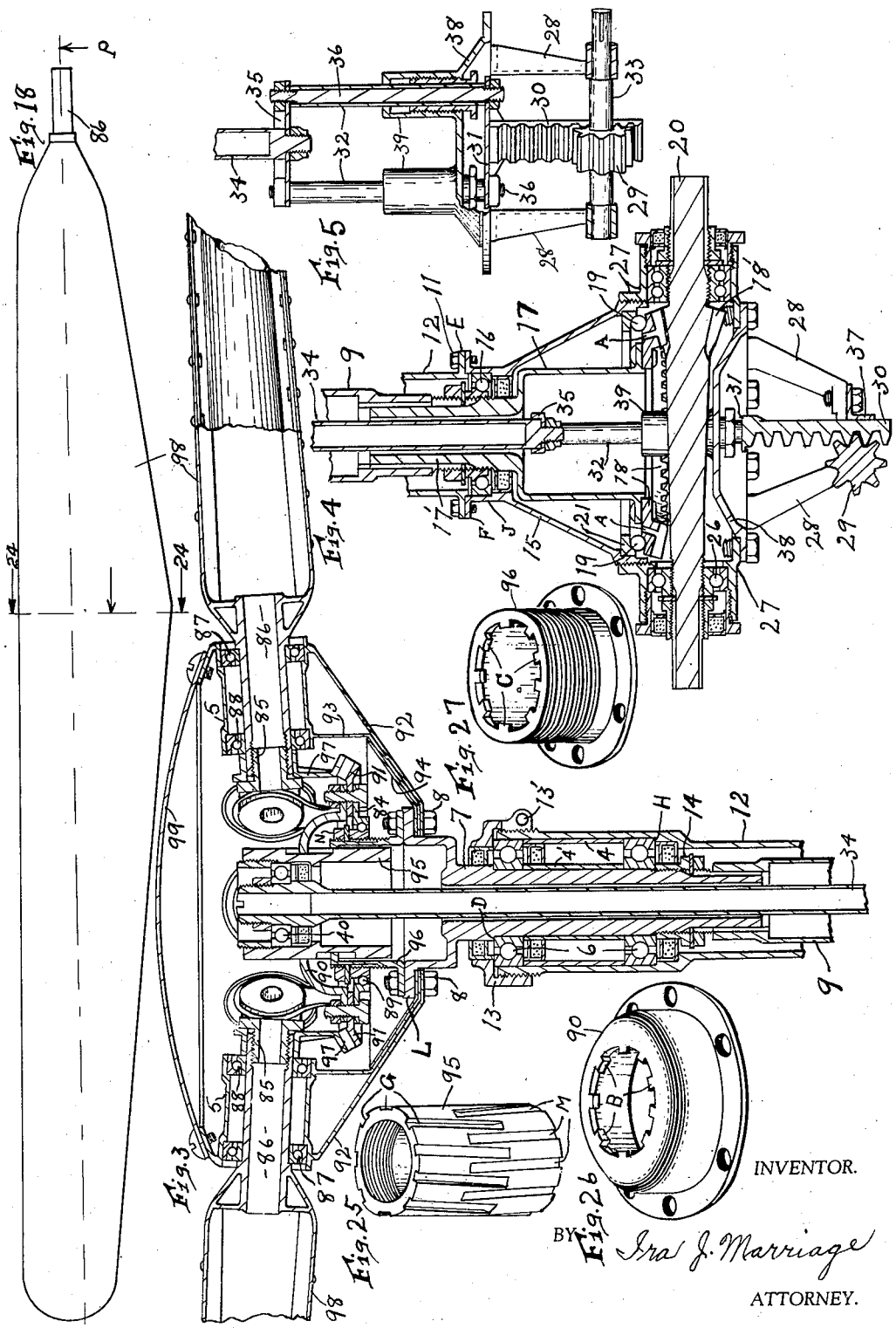
INVENTOR.
BY *Ira J. Marriage*
ATTORNEY.

Nov. 15, 1949 — I. J. MARRIAGE — 2,488,018
TANDEM ROTARY HELICOPTER
Filed Aug. 23, 1943 — 6 Sheets-Sheet 3

INVENTOR.
BY *Ira J. Marriage*
ATTORNEY.

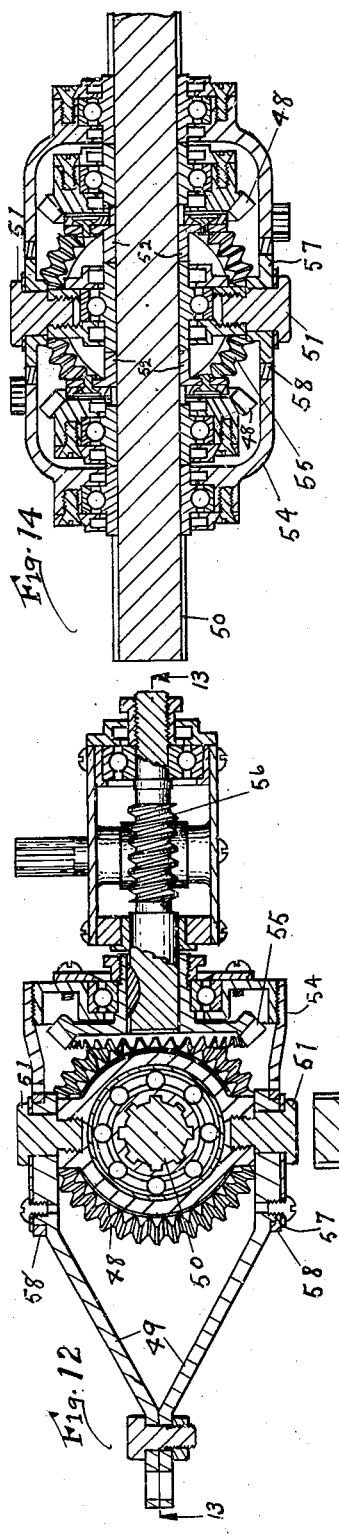

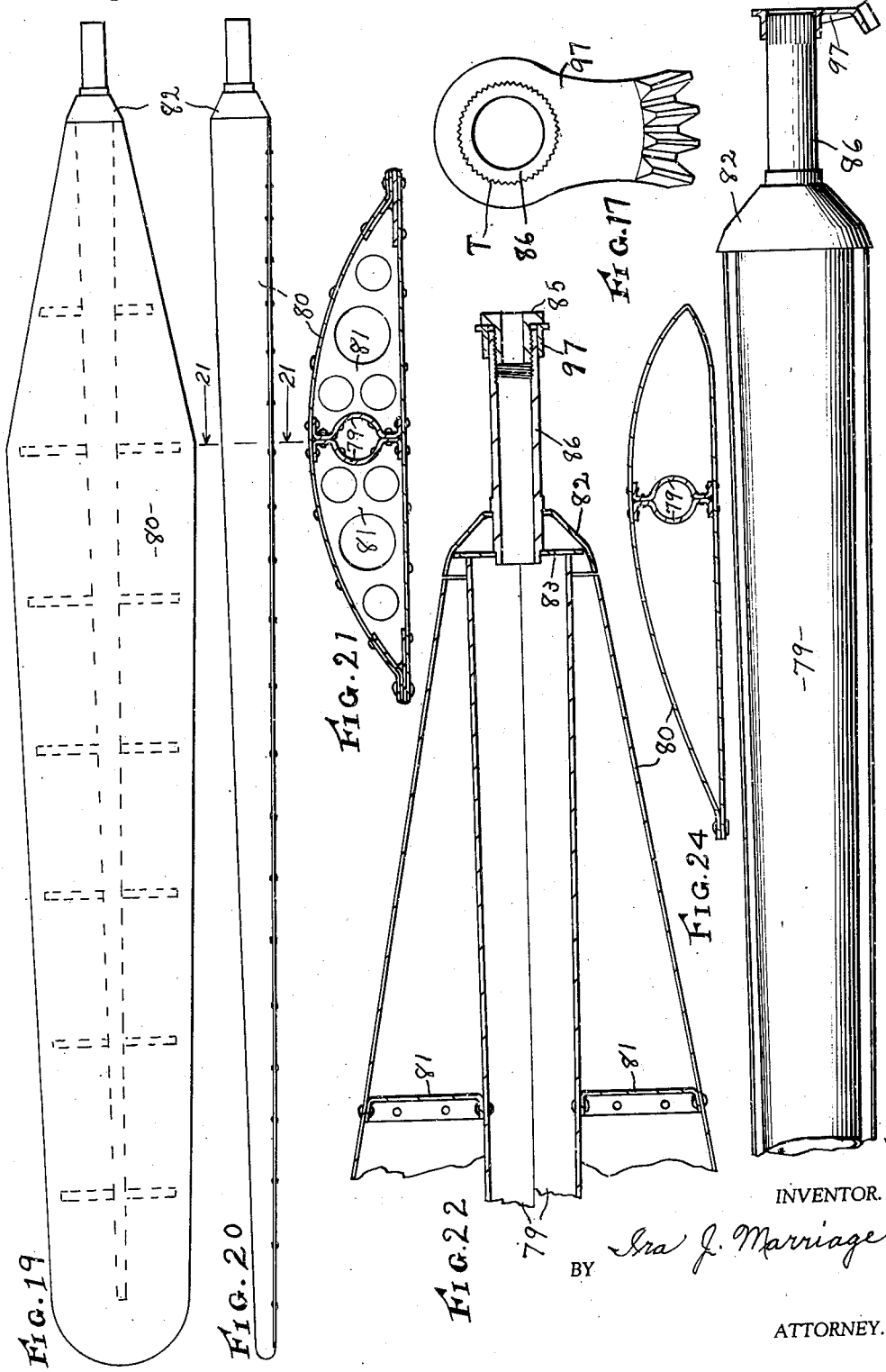

Nov. 15, 1949     I. J. MARRIAGE     2,488,018
TANDEM ROTARY HELICOPTER

Filed Aug. 23, 1943     6 Sheets-Sheet 6

INVENTOR.
BY  Ira J. Marriage
ATTORNEY.

Patented Nov. 15, 1949

2,488,018

UNITED STATES PATENT OFFICE 2,488,018

TANDEM ROTARY HELICOPTER

Ira J. Marriage, Kansas City, Kans.

Application August 23, 1943, Serial No. 499,611

9 Claims. (Cl. 244—17.23)

My invention relates to improvements in aircraft and particularly an aircraft commonly known as a helicopter.

The principal object of the present invention is to provide an aircraft capable of making a vertical take-off and landing.

A further object of my invention is to provide an aircraft dispensing with the usual type of wing-elements, also the directional and elevating rudders, and furthermore to eliminate the usual method of propulsion, by substituting controlled locomotion through horizontal propellers above the aircraft.

A still further object of my invention is to provide a horizontally disposed propeller near each end of a fuselage as carrying, propulsion and guiding means for said aircraft.

A still further object of my invention is to employ a principle of propulsion whereby the fuselage in mid-air may be efficiently controlled as to speed, directional flight, maintenance of position at a desired altitude, and ability to turn on a vertical axis for abrupt heading of the craft directionally.

A still further object of my invention is to provide a tilting means for the propeller-blades to slant the same in either direction from a horizontally inclined position, and to tilt the entire group of blades of each propeller simultaneously and independent of the other group.

A still further object of my invention is to provide hollow propellers supported by a fuselage, and rotarily arranged therewith, and means to tilt the blades thereof in either direction from their horizontally inclined place, through the medium of toothed gear mechanism within the propeller heads.

A still further object of my invention is to accomplish directional control by arranging a fuselage in two separate parts held together by interlocking slide-couplers of arcuate contour, with gear toothed mechanism attached thereto for both locking and shifting means, and each fuselage section having a variable pitch propeller attached firmly thereto in a horizontal position above and near the extreme end thereof, and a power take-off from the engine shaft for driving the said gear toothed mechanism of the interlocking slide couplers in opposite directions for tilting said propellers transverse to the alignment of said fuselage.

These and other objects hereinafter stated will be more fully explained, reference being had to the accompanying drawings forming a part of this specification, and in which like characters will apply to like parts in the different views, wherein:

Fig. 3 is an enlarged detailed view of a propeller in section, including control elements therein.

Fig. 4 is an enlarged detail side view of a journal-box gear-housing in section, with driving and control mechanism therein and attached thereto.

Fig. 5 is a view of the lower portion of a control unit partly in section and shown also in combination with Fig. 4.

Fig. 12 is a sectional end view of the power take-off transmission taken on a line 12—12, Fig. 13, through which power is transmitted for the control of directional flight of the aircraft.

Fig. 13 is a cross section plan view taken on a line 13—13 of Fig. 12.

Fig. 14 is a cross section front view of the power take-off taken on a line 14—14, Fig. 12.

Fig. 15 is a front end view of the worm-gear housing which is also shown attached and in section in Figs. 12 and 13.

Fig. 16 is an outer plan view of the greater portion of Fig. 13, without the worm-gear attachment.

Fig. 17 is a plan view of a sector-gear on the face side with a propeller-blade shank inserted therein.

Fig. 18 is an enlarged plan view of a propeller blade.

Fig. 19 is an enlarged plan view of a modified propeller blade.

Fig. 20 is a side view of Fig. 19.

Fig. 21 is an enlarged cross section view taken on a line 21—21 of Fig. 20.

Fig. 22 is an enlarged sectional plan view of the shank-end portion of a modified form of propeller blade.

Fig. 23 is a side view of the shank-end portion of the inner main structure of a propeller blade with a shank attached thereto and with a cross section side view of a sector-gear positioned in its proper place on the extreme end of said shank.

Fig. 24 is a cross section view taken on a line 24—24 of Fig. 18.

Fig. 25 is a perspective view of a grooved cylinder which is also illustrated in cross section in the center of Fig. 3.

Fig. 26 is a perspective view of a flanged hub element with teeth that fit the upper grooves of said cylinder, the said hub element being also illustrated in cross section within Fig. 3.

Fig. 27 is a perspective view of a flanged cylinder with teeth that fit the lower grooves of said grooved cylinder, and is also illustrated in cross section within Fig. 3.

Figure 29:
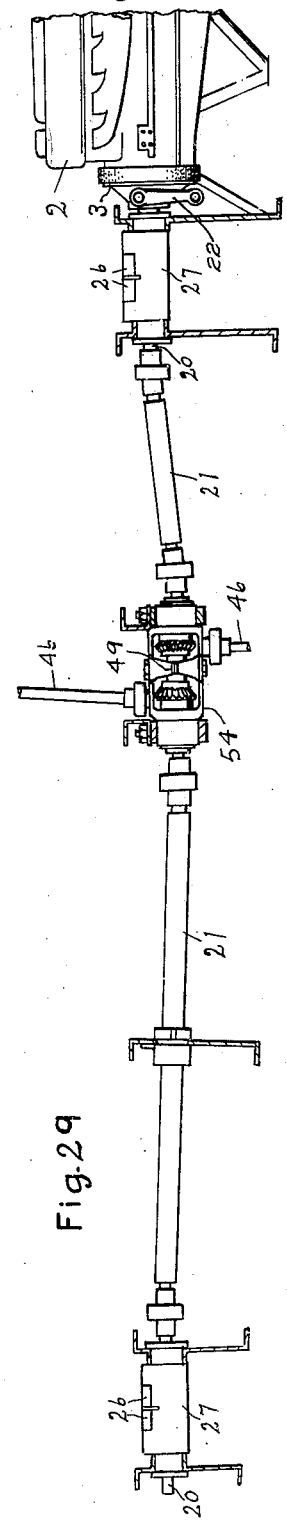

Fig. 29 is a side view of two journal boxes with a combination drive-shaft gear-pinion positioned within each and joined together by an intermediate drive shaft, with bearing supports for said intermediate drive shaft, and for said journal boxes; also a power take-off in combination with the intermediate drive shaft; also a clutch and front portion of a motor attached to the rear end of the drive shaft system.

Figure 30:
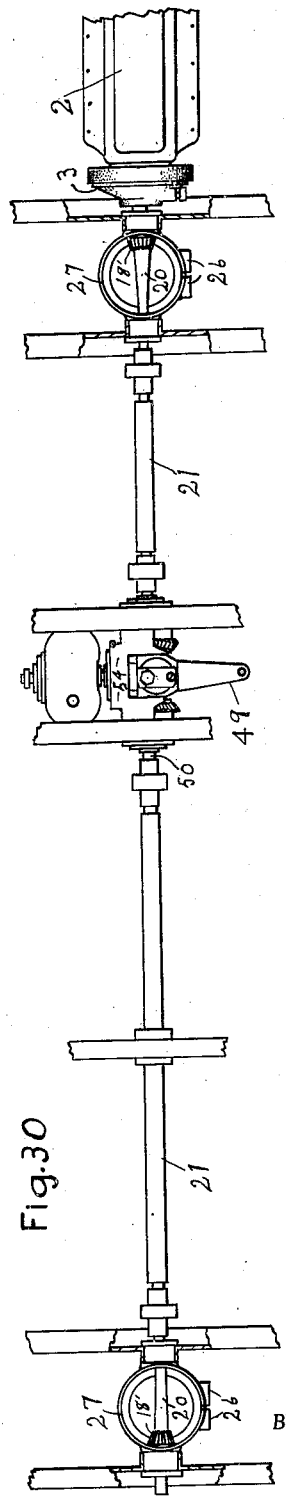

Fig. 30 is a plan view of Fig. 29.

Figure 31:
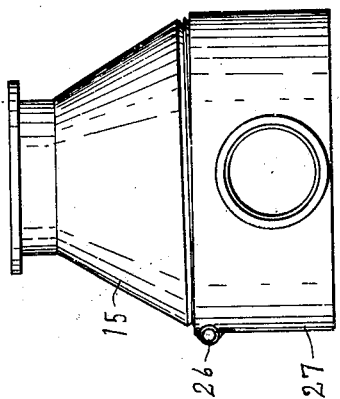

Fig. 31 is a front view of a journal-box gear-housing.

Referring more in detail to the drawings: 1 designates a fuselage having a motor 2 positioned in the rear thereof preferably, by which means power is transmitted through a clutch 3 to the propulsion elements hereinafter described, each of which are alike in detail except the driving power is applied oppositely to each propeller for driving, but the description will refer to the mechanism of the rear propeller principally.

When considerable increased power and capacity is needed two motors may be used to good advantage by attaching a separate motor to each individual drive-shaft 20, thus eliminating the intermediate drive shaft 21, in which event the preferable position of the motor for the rear propeller would be in front of its journal-box gear-housing, and the motor for the front propeller would be behind its journal-box gear-housing. Each motor is firmly mounted close to the journal-box gear-housing and within its own fuselage section, so that the power to the power take-off can be supplied most effectively through an auxiliary shaft from the rear end of one of the motors, preferably from the motor in the rear section, and under which condition, for greater practicability, the couplers should be reversed by attaching the female couplers, and the power take-off unit to the front of rear section, and the male couplers to the rear of the front section.

Figure 1:
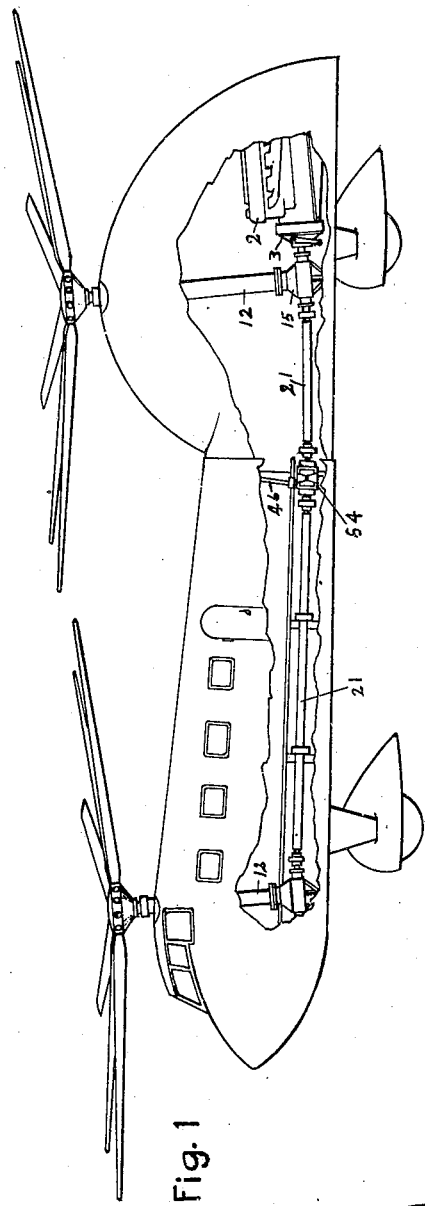
Fig. 1 is a side view of the aircraft, with parts removed for convenience of illustration.

The intermediate portion of the fuselage may be diverted to passengers or cargo. Above the rear end of the fuselage is a propeller horizontally positioned, and consisting of a plurality of blades 98 radially extending from a common center, the vertically inclined axis of which is slantingly positioned downwardly and rearwardly as shown in Fig. 1, the blade elements being positioned at nearly right angles to the said axis, as illustrated in Fig. 1, which shows a slight upward slope of the blades in respect to a straight longitudinal line between each pair of opposite members.

Figure 2:
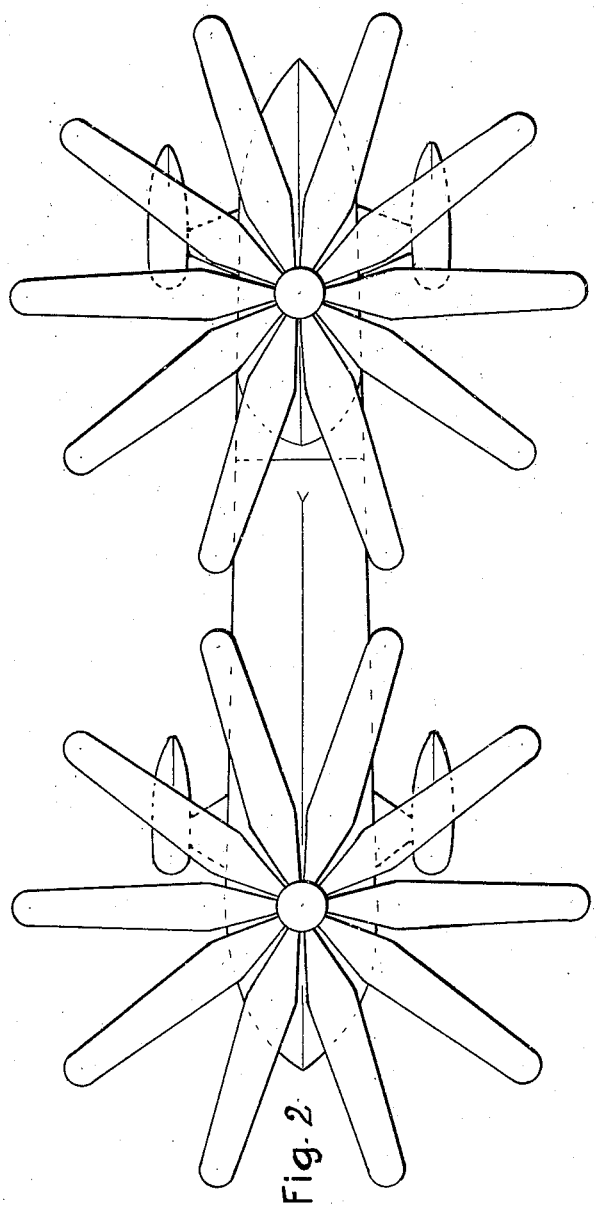
Fig. 2 is a plan view of the aircraft.
Figure 28:
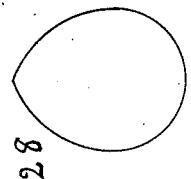
Fig. 28 is a design illustration of the general contour of the fuselage, from a longitudinal viewpoint, between the front propeller and couplers.
Figure 7:
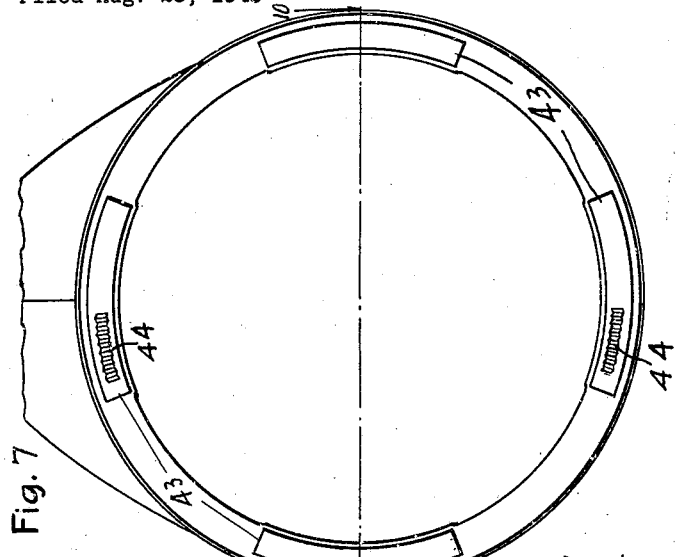
Fig. 7 is a plan view of a male slide coupler including two sets of gear teeth integral therewith.
Figure 10:
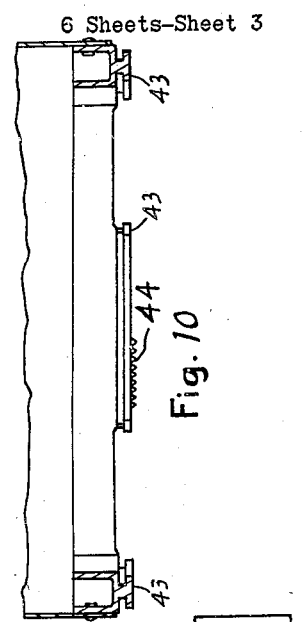
Fig. 10 is a cross section taken on a line 10—10, Fig. 7.
Figure 8:
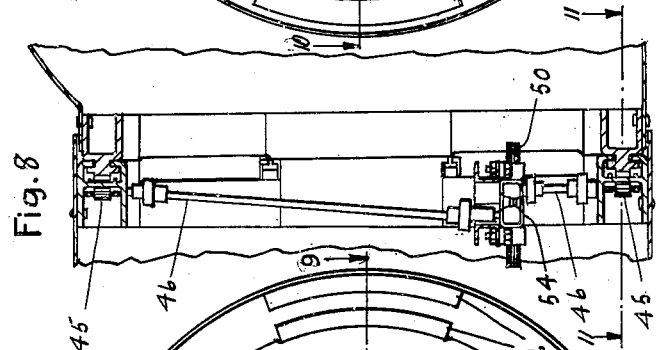
Fig. 8 is a combination of Figs. 6 and 7 in cross section, thus illustrating how the interlocking slide couplers fit together.
Figure 11:
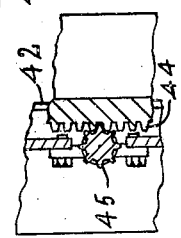
Fig. 11 is an enlarged fragmentary cross section of the lower couplers taken on a line 11—11, Fig. 8, and including gear mechanism which serves to control radial movement of couplers in opposite directions.
Figure 6:
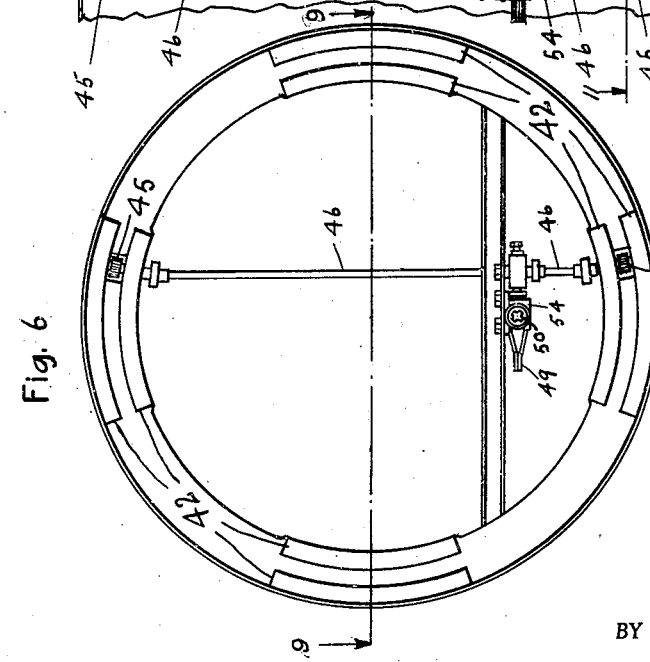
Fig. 6 is a plan view of a female slide coupler including a power take-off unit and mountings therefor.
Figure 9:
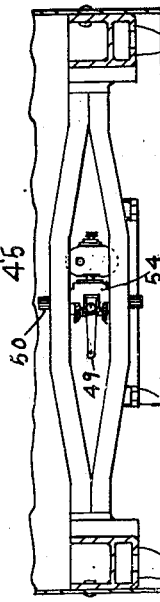
Fig. 9 is a cross section taken on a line 9—9, Fig. 6.

At the front of the fuselage is another propeller similar in construction and positioned in like manner; the said propellers are aligned on the longitudinal axis of the fuselage as shown in Fig. 2. Also note that the rear propeller is positioned on a higher plane than the front propeller, as is shown in Fig. 1.

As means to enclose the operating elements of the blades, and to support the blades and their bearings, I have arranged an intermediate housing 93 and an exterior similar housing 92, as shown in Fig. 3. The walls of the said housings converge at the lower ends thereof to close engagement, and being riveted and welded together with a conical reinforcing plate 94, all said parts are rendered integral in construction thus forming a head, and being secured to a flange L of a hub element 7 by a plurality of capscrews 8 spaced there-around, the housing-head and the hub are rotary with a tubular drive-shaft 9 carrying the blades therewith. The said drive-shaft is being shown only in its upper and lower end cross section parts in Figs. 3 and 4, and it is telescopically secured by splines to the shank end of the said hub 7 in Fig. 3, and to hub shank 17 in Fig. 4.

The upper end extremity of housing 93 is joined to the exterior housing 92 by annular members 5 within which are spaced the bearings for carrying propeller blades. The top opening of the head is enclosed by a crown-plate 99, as protective means for mechanism therein.

Held rigidly at the top of the fuselage is the upper end portion of a tubular housing 12 within which are annular thrust bearings 6 spaced apart by tubular spacers 4 and 4', the lower ball race firmly seated against a shoulder H by means of an open cap-like element 13 which engages on the outer top ball race, and is threadedly engaged to the upper end of the housing 12, and securely locked thereto by clamping it with a tension bolt through aperture 13' in one side of the cap-like element 13, by which arrangement the pair of ball bearings 6 are attached in operative position as a bearing for the structure at the top of the fuselage, rotating freely therein; it being understood that the outside ball races are attached to the interior of the said housing 12, while the corresponding interior races are secured to the said shank of hub 7, the lower end portion of which is threaded to receive a nut 14, threadedly engaging thereon to avoid a longitudinal movement of the hub in one direction, and the other direction through the medium of a shoulder D abutting the inner race of the upper ball-bearing.

The said housing 12 is tubular in form, extending downward and having a flange E seated on a flange F of the neck of the upper portion of a gear-housing 15, as illustrated in Figure 4, and secured thereto by cap screws 11 spaced there-around.

Within the upper neck portion J of the gear housing 15, is an annular thrust bearing 16 having its outer race seated on a shoulder within said neck, and its inner race threadedly engaged on the vertical shank 17' of a ring-gear hub 17, thus serving as adjusting means for proper spacing of the bearing 16 and a thrust bearing 19 located on the upper back surface of said gear.

It is to be understood that through the engagement of said shaft 9 to the shank of hub 7 at its upper extremity, and to the shank 17' at its lower extremity, said engagement provides a means through which motive power is transmitted to the propeller.

The said hub 17 is cup-like in form for a purpose hereinafter described, and has a ring-gear 18 secured to the mouth thereof, the teeth of which are in mesh with a gear-pinion 18' that is integral with a drive-shaft 20, as rotating means for the shaft 9, in one direction, while a similar shaft 9 of the front propeller will rotate in the opposite direction by reason of its respective drive pinion 18' being positioned on the opposite side of its ring-gear member with respect to that of the rear propeller, each gear being driven by a said drive-shaft 20 that extends from the motor 2, and in proximity thereto.

I have arranged a clutch 3, of the disk type, and means to control same through the medium of a lever 22 to which a cable may be secured through an eyelet in one end thereof, as manipulating means therefor. I have also arranged a flexible coupler within the bearing of said clutch, by which means a slight disalignment of the drive shafts may occur without causing shaft crystalization or deterioration of bearings.

The drive shaft 20 has a two point bearing at the base of each propeller, through the medium of a journal box 27 respectively as shown in Figures 4 and 29 and 30 and 31, the same being an intermediate portion of the ring-gear housing member 15, and to its under side a lower plate member 38, removably arranged but oil tight.

As a means for controlling that pitch of propeller blades a tubular rod 34 is used as a connecting element between upper and lower mechanism shown in Figures 3, 4 and 5, all of which will be described in the following paragraphs. The said rod is shown only in section and in parts, including both upper and lower extremities of same. The lower end of said rod is securely attached to a cross bar 35 which is rigidly engaged near each end thereof against the ends of a pair of slidable spacer-tubes 32 that extend downward through guides 39 which are integral with the plate member 38 and are extended upwards on each side of the drive-shaft 20, thus providing means for longitudinal control movement of the rod 34 through its component mechanism below said drive-shaft without interference therewith. At the lower ends of said spacer-tubes 32 is a rack-gear 30 having its cross-head 31 attached rigidly against said spacer-tubes by stud-bolts 36 which connect both cross members 31 and 35 through said spacer tubes.

A toothed spur-gear 29 is integral with a shaft 33 and is engaged in mesh with the rack-gear 20; and through the spur-gear shaft 33, which is carried rotatably in bearings at the lower extremity of bracket arms 28, power is applied to rotate its gear and to forcibly move the said rack-gear longitudinally and all upper parts attached therewith up and down. Any suitable driving means, preferably a sprocket-wheel and chain with cable extension to the pilot's control, for rotation of the said spur-gear, may be used by having the sprocket-hub, or other means, keyed to the extended end of said shaft 33. A backing-bar 37 is attached to the bracket arms as a guide and backing support to the rack-gear when force is applied against same.

The upper end portion of the rod 34 is securely attached to the inner race of an annular thrust-bearing 40, the outer race of which is firmly secured, but removable, to the inner wall of a spirally grooved cylinder 95, the said cylinder being equipped with a double set of grooves spiralled counter to one another as illustrated in Figure 25, the lower grooves M having a smooth sliding fit engagement with the teeth C, of cylinder 96, and the upper grooves having a smooth sliding fit engagement with the teeth B of a hub element 90. It will be observed that said cylinder 96 is rigidly attached to the flange L of hub 7 centrally positioned thereon with its toothed end uppermost to serve as a guiding means for the said cylinder 95 when same is moved longitudinally therein. Furthermore, the said cylinder 95 is moved rotationally, relative to all other head parts during its longitudinal movement, said rotational movement being induced by its spiral grooves in proximity with the teeth C of cylinder 96. Notice further that cylinder 96 carries an annular ball-bearing 89 having its inner ball-race threadedly engaged thereabout and adjustable longitudinal on the outer threaded surface of said cylinder for a purpose later described. The outer ball-race of said bearing has an annular flange 84 to which a toothed master-gear 91 and hub element 90 are securely attached and centrally positioned thereupon so that the teeth B of said hub are in mesh with the grooves G in cylinder 95 and being a smooth slidable fit therein so that the hub and all its attached parts are rotationally movable, with respect to the head, by means of the spiral grooves G during a longitudinal movement of the said cylinder and by the rotational motion of the cylinder as above described which is always in the same rotational direction as the movement of said hub, thus coacting therewith to increase the movement of said hub and parts thereto. Note further that all sector-gears 97 are angularly spaced and radially positioned within the propeller head by attachment to the shanks 86 of propeller blades 98 and are maintained in proper mesh with the master-gear 91 by means of adjustment of said master-gear through the longitudinal displacement of the inner race of bearing 89 and locked thereto by a lock washer and a pressure nut N, thus insuring proper contact of the master-gear teeth in mesh with sector-gear teeth at all times so that all propeller blades of the same propeller unit are adjusted equally in pitch when the said master-gear is moved rotationally with respect to the head. The extreme end portion of each propeller-blade shank has spline grooves T as illustrated in Figures 17 and 23, and fitted to the hub of the sector-gear which is also grooved correspondingly for a tight fit thereby insuring against rotational movement on the said shank. To insure easy rotational pitch adjustment of the propeller blades I have secured their shanks 86 within annular ball-bearings 87 and 88 the latter being adaptable to thrust and seated against shoulders within housings 5 that are integral with the head and radially positioned therein from its outer periphery; the blades being secured against centrifugal force by a tubular cap-screw 85 threadedly engaging in the inner end of the shank, and serving also as securing means for the sector-gear on the end of said shank. Thus, when the shaft 33 is revolved in either direction its spur-gear 29 forcibly moves the rack-gear 30, and all its entire dependent mechanism in accordance therewith, causing the master-gear 91 to move radially relative to the head, and rock all its sector-gears in like proportions, thus effecting the desired pitch of the propeller blades.

The hub 17 of the ring-gear 18 is provided with sufficient inner space to permit the free movement of the cross-bar 35 with all its attached parts which must function therein.

As an improvement in an annular thrust bearing against the ring-gear when power is applied, I have made a rounded groove ball-race on the upper back surface of said ring-gear around and near the outer periphery thereof, on which the balls 19 are carried. The upper thrust race of said balls is seated rigidly within the lower part of the upper gear-housing member 15, and as an oiling means for said bearing I have provided apertures A between the gear teeth of said ring-gear so that portions of oil, in which the drive pinion 18' revolves, may be forced by said revolving pinion through said apertures near the inner edge of the lower ball-race and from thence into the ball-race through the medium of centrifugal force. The upper gear-housing member 15 is threadedly engaged to the journal-box 27 and provides a means for proper adjustment of the ring-gear with respect to the driving pinion. As locking means against the turning of said upper gear-housing member, I have provided eye-hole bosses 26 on the outer surface of the journal-box integral therewith near its upper edge and spaced apart near the edges of a vertical open slot extending from the upper edge of said journal-box downward between and past said bosses, thus affording means through which compression strain can be applied against the threaded portion of gear-housing 15 by tightening a bolt against the said bosses, thereby insuring against maladjustment of the said pinion and ring-gear.

My directional control system includes means for tilting the propellers counter to each other, and counter to the longitudinal direction of the fuselage, thus causing the craft to turn as desired on its center of gravity. This method of guiding the craft is accomplished in two different and practical ways. The first manner of control is accomplished by tilting the front propeller on the axis of its journal-box bearings sidewise from the central alignment of the fuselage by means of a power element attached to the fuselage structure and to the upper end portion of the tubular housing 12; and by providing a slotted opening crosswise in the top of the fuselage, through which said housing extends, said tilting action is accomplished to the right and to the left of said alignment when desired, thereby guiding the craft in the direction said propeller is tilted.

The second manner of control is accomplished by arranging a fuselage in two sections with a propeller rigidly attached to each section, and the sections attached together by interlocking slide-couplers integral with the ends of said sections, the said couplers being illustrated in Figs. 6, 7, 8, 9, 10, and 11 including illustrations of a power take-off transmission and its component parts for the radial control of said couplers and fuselage sections. It being clearly understood that any amount of radial counteraction of the two sections affects their propellers in like proportion relative to a normal alignment of the two. Thus, when the air becomes displaced at counter angles by the propellers a turning action of the craft is effected.

The two sets of couplers are illustrated in said figures disclosing two distinct types, namely; four female couplers 42 and four male couplers 43, each of which is arcuate in contour and integral with a circular frame, which frame is made a part of the main structure of the fuselage, one coupler set being integral with the rear end of the front section, and the other set of couplers integral with the front end of the rear section, thereby providing a means of coupling together the fore and aft sections of the fuselage rigidly with respect to longitudinal alignment, and movable rotationally counter to one another on a common axis by having an easy sliding fit of the coupler elements 43 within the jaws of couplers 42.

Two of the male elements 43 are equipped with gear teeth 44 integral with the face side thereof, and are arranged to properly mesh with and match gear pinions 45 which are mounted rotarily to couplers 42, and workably attached thereto by bearings, and through shafts 46 to worm gears 47, which worm gears are illustrated in Fig. 13 of the power take-off transmission.

The said transmission is non-operative except when clutch pressure is applied against one of the hubs of a bevel gear 48 by adequate movement of a forked lever 49, the axis of which is centrally located at a right angle with the alignment of a splined drive-shaft 50, said axis being maintained at said relative position by pivot-pins which are threadedly attached to the housing of an outer ball race of a bearing having its inner race slidably fitted to said shaft.

Abutting each end of said inner race is a hub element 52 slidably fitted in mesh to the same splined shaft 50; and integral with the outer end of each said hub element is a face-plate with clutch-fiber attached to the face side thereof, forming a clutch-plate 53. Closely in front of each said clutch-plate is the said bevel-gear 48 centrally mounted on the said shaft 50 with a ball-bearing in its hub for the sake of neutrality and independence of the said gear relative to the shaft. Abutting the outer end of the inner race of each of those said gear bearings is another ball bearing with its inner race fitted to the same shaft 50 and having a housing 54 secured to its outer race, thereby sustaining a housing structure for the support of a third bevel gear 55, and its component parts.

The said gear 55 is positioned between and at right angles to the other two gears 48 and in close operative mesh therewith. Thus when one of the clutch plates engages the hub-face of a bevel gear 48 power is transmitted to drive said gear which in turn drives gear 55 including also its worm shaft 56 which in turn drives the two worm-gears 47 in opposite directions to each other, thereby making them co-act perfectly in the function of transmitting power to the said gear pinions 45, through shafts 46, for the movement of the fuselage sections rotationally in opposite directions, thus tilting the said propellers counter to each other in any desired amount for immediate directional control of the aircraft.

It is to be understood that when one of the said bevel gears 48 is being driven by a clutch-plate 53 the opposite gear 48 is free from friction and is driven idle in the opposite direction by gear 55. The opposite result is obtained throughout by forcing the opposite clutch-plate against the opposite bevel gear, which actions are controlled through the forked lever 49 in combination with a circular boss 57, on the end portion of each fork, pivot-pins 51 eccentrically arranged through said bosses, and a bearing 58 workably fitted around each boss, the outer edges of which are straight and slidingly fitted between jaws 59, which jaws are integral with the housing structure and a part thereof, thus affording a fulcrum on each side of the forked lever and its bosses, against which a forceful thrust of a said clutch-plate may be produced against a gear hub when the said lever is moved adequately.

In reference to detail structural features of my propeller blades, Figures 21 and 24 illustrate cross sections of two different types of blades, the main difference being in their cambers. The longitudinal inner structure 79 is identical in both types and is composed of two sections riveted and welded together into the form of a tapering tube with right-angle flanges above and below running parallel with the tube, thereby lending added strength and providing a convenient structural means for attachment to the covering 98 and to the inner ribs 81. In Fig. 22 it can be readily understood that the large end of the said tapered-tube 80 is inserted within a bell shaped element 82 and abutting a circular plate 83, both element and plate being welded to a shank 86 when in a finished stage, after which the said tapered-tube is welded to said element and plate.

Fig. 23 illustrates a side view of said tapered-tube attached to said bell shaped element and shank. Fig. 19 illustrates, by longitudinal broken lines, the central location of said tapered-tube with respect to the outer blade covering. The cross-wise broken lines illustrate the inner ribs.

When my helicopter is engaged in flight the propeller blades must of necessity be in rotation and have enough pitch for sufficient lifting and driving capacity. It is to be understood that forward motion and varying speeds of the craft are governed by the ratio of hoisting capacity allotted each propeller through its variable pitch blades. Let us assume for example, that the blades of the front propeller are set at a seven degree pitch, and that the rear propeller blades are set at eight degrees, thus subjecting the rear propeller to a greater lifting capacity, resulting in hoisting the rear end of the craft higher than the front end, consequently tilting both propellers forward in like proportion to the amount of tilt given the fuselage. Assuming further that this forward tilt of the propellers is equal to seven degrees from a horizontal plane, there is reason to expect fast forward speed of the craft, for the reason that by tilting of the propellers all blades of each propeller become positioned for revolving on an inclined plane equal to the amount of tilt given each respective propeller, and during each revolution thereof, each blade is constantly changing its pitch ratio relative to horizontal while maintaining a uniform pitch with respect to an inclined plane and with one-another. As long as the propellers are inclined, the pitch of their respective blades, relative to horizontal varies most in the zone which is at right angles to a horizontal line passing through the center of each respective propeller in the direction of its incline. Thus, if the blades have a pitch of seven degrees and the propellers become tilted seven degrees from horizontal the extreme blade pitch with respect to horizontal becomes fourteen degrees on one side of said line and horizontal on the opposite side thereof, consequently increasing their driving power within and nearest their fourteen degree zone and minimizing head resistance to rotation in the direction of propeller incline within and nearest their horizontally positioned zone, thereby performing in a most efficient manner toward flight in the direction of propeller incline.

Having thus described my invention, what I claim as new and desire to secure by Letters Patent is:

1. An aircraft of the character described comprising, a fuselage having two sections rotatably connected together in longitudinal alignment, a pair of propellers located above said fuselage and near the respective ends thereof, a drive shaft located within and longitudinally of the fuselage, one end of said shaft being adapted to be inclined with respect to the other, means for supplying rotary power to said shaft, propeller shafts operatively connecting said drive shaft with said propellers for rotating said propellers, means selectively operatively connectable with said drive shaft for rotating the fuselage sections transversely with respect to one another in either direction said means including interlocking coupling members on said sections and gear and clutch mechanism connected with the drive shaft and the rotary power means, and means on said propeller shafts to vary the thrust of the propellers independently of each other to accelerate change in the direction of travel of the aircraft.

2. An aircraft of the character described comprising, a fuselage composed of two sections pivotally joined together in longitudinal alignment, means for rotating said sections one with respect to the other, propellers in spaced relation on said fuselage having a plurality of blades, said propellers being in longitudinal alignment with said fuselage, a drive shaft located longitudinally of said fuselage, means for driving said shaft, propeller shafts connected to the longitudinal drive shaft and said propellers, means for supporting the vertical shafts on the drive shaft, gears on said propeller shafts for driving said propellers in opposite directions, means for rotating the fuselage sections with respect to each other to change the position of the propellers, and means for varying the thrust of the propellers independently of each other to increase the tendency to vary the direction of travel of the aircraft.

3. An aircraft of the character described comprising, a fuselage composed of two sections pivotally joined together in longitudinal alignment and moveable rotationally with respect to each other, a propeller having a plurality of blades positioned above each section in longitudinal alignment with said fuselage, a drive shaft located longitudinally of said fuselage, means for driving said shaft, vertical drive shafts connected to the longitudinal drive shaft and said propellers, gears on said shafts for driving said propellers in opposite directions, and means for moving said fuselage sections in opposite directions for varying the slant of said propellers transverse to each other for controlling direction of the aircraft.

4. An aircraft of the character described comprising, a fuselage having two sections pivotally connected together in longitudinal alignment, a drive shaft extending longitudinally of said fuselage, said drive shaft having driving connection with said sections, spaced bearings on said drive shaft, propeller shafts supported in said bearings on said drive shaft, propellers operatively connected to said propeller shafts above said fuselage sections in spaced relation to each other, means for driving said drive shaft, and means for rotating said fuselage sections one with respect to the other to vary the slant of said propellers transversely to each other for controlling direction of travel of the aircraft.

5. An aircraft of the character described comprising, a fuselage composed of two sections and rotatably connected together in longitudinal alignment, a drive shaft extending longitudinally of the fuselage, rotary power means, power transmission means on said drive shaft having connection with said fuselage sections for selectively rotating one section relative to the other said means including interlocking coupling members on said sections and gear and clutch mechanism connected with the drive shaft and the rotary power means, spaced bearings on said shaft, propeller shafts supported in said bearings and extending above said fuselage sections, propellers having blades thereon operatively connected to the upper end of said propeller shafts above said fuselage sections, means for driving said drive shaft, and means on said propeller shafts and said propeller blades for changing the position of said blades, the rotation of the fuselage sections varying the slant of said propellers for controlling direction of travel of said aircraft.

6. An aircraft of the character described comprising, a fuselage composed of two sections pivotally joined together in longitudinal alignment and movable rotatively with respect to each other, a propeller having a plurality of blades positioned above each section in longitudinal alignment with said fuselage, said blades being inclined upwardly to provide substantially dish-shaped propellers, a drive shaft located longitudinally of said fuselage, means for driving said shaft, vertical drive shafts connected to the longitudinal drive shaft and said propellers for driving the propellers, and means for rotating said fuselage sections in opposite directions for varying the slant of said propellers transverse to each other for controlling direction of the aircraft.

7. An aircraft of the character described comprising, a fuselage composed of two sections pivotally joined together in longitudinal alignment and movable rotatively with respect to each other, a propeller having a plurality of blades positioned above each section in longitudinal alignment with said fuselage, a drive shaft located longitudinally of said fuselage, means for driving said shaft, vertical drive shafts connected to the longitudinal drive shaft and said propellers for driving the propellers, and means for moving said fuselage sections in opposite directions for varying the slant of said propellers transverse to each other for controlling direction of the aircraft.

8. An aircraft of the character described comprising, a fuselage having two sections pivotally connected together near the center thereof in longitudinal alignment and selectively movable rotatably with respect to each other, a propeller having a plurality of blades positioned above each section, the rear propeller being on a slightly higher plane than the front propeller, means carried by the respective fuselage sections for rotatively supporting the propellers, a drive shaft located within and longitudinally of said fuselage, means for supplying rotary power to said shaft, propeller shafts operatively connecting said drive shaft with said propellers for rotating the same, and means for rotating said fuselage sections in opposite directions about their axes for varying the slant of said propellers transversely to each other for controlling direction of the aircraft.

9. An aircraft of the character described comprising, a fuselage having two sections rotatively connected together about their axes, propellers located in spaced relation above said fuselage sections, means for supporting said propellers, propeller shafts, means for applying power to said shafts for rotating the shafts, and means for rotating the fuselage sections in opposite directions for varying the slant of said propellers for controlling direction of travel of the aircraft.

IRA J. MARRIAGE.

REFERENCES CITED

The following references are of record in the file of this patent:

UNITED STATES PATENTS

| Number | Name | Date |
|---|---|---|
| 982,647 | Vaniman | Jan. 24, 1911 |
| 997,884 | Wells | July 11, 1911 |
| 2,023,105 | Smith | Dec. 3, 1935 |
| 2,233,747 | Riedl | Mar. 4, 1941 |
| 2,273,303 | Waldron | Feb. 17, 1942 |

FOREIGN PATENTS

| Number | Country | Date |
|---|---|---|
| 447,931 | Great Britain | May 28, 1936 |